United States Patent Office

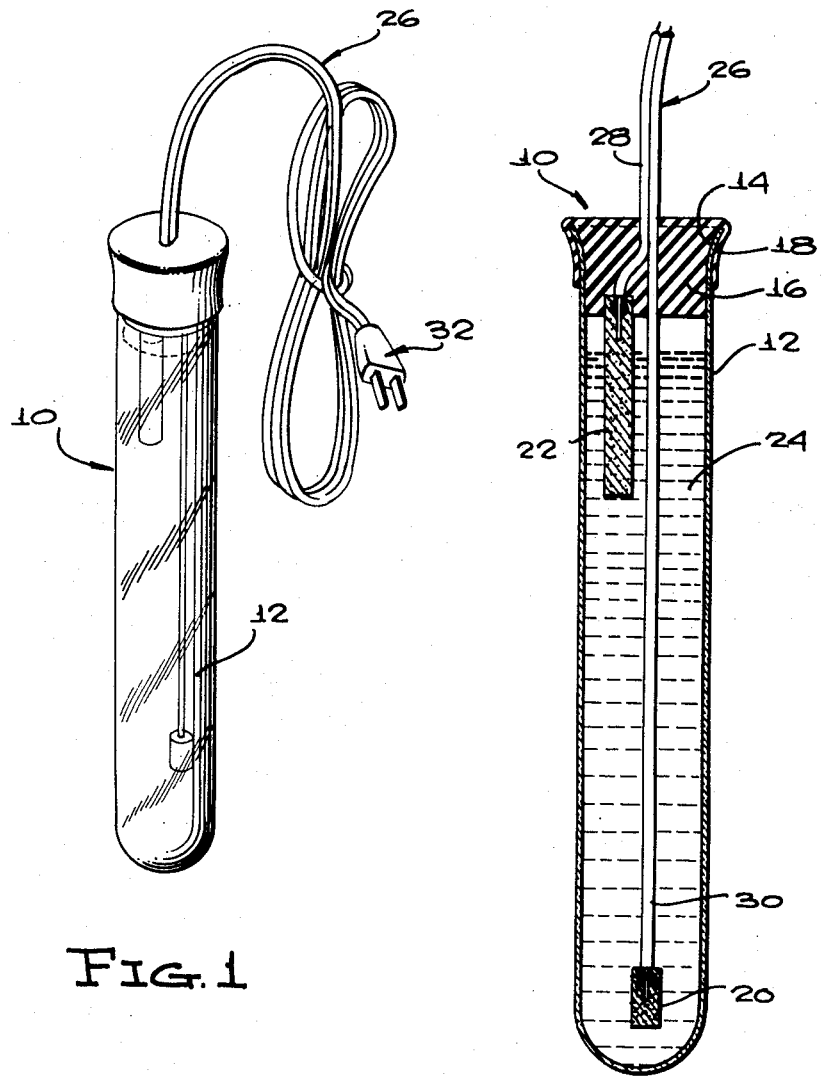

2,914,649
Patented Nov. 24, 1959

2,914,649

AQUARIUM HEATER

Everett W. Stott, Edmonton, Alberta, Canada

Application May 29, 1958, Serial No. 738,785

2 Claims. (Cl. 219—40)

The present invention relates to a heater for an aquarium.

An object of the present invention is to provide a heater for an aquarium which is inexpensive, one requiring no thermostat in conjunction therewith for maintaining an even and steady heat within an aquarium, and one which is highly efficient in action.

Another object of the present invention is to provide a heater for an aquarium which is compact in size, one requiring only one pair of wires for connection to a source of current, and one which is commercially feasible.

These and other objects and advantages of the present invention will be fully apparent from the following description when taken in conjunction with the annexed drawing, in which:

Figure 1 is an isometric view of the aquarium heater according to the present invention; and Figure 2 is a sectional view of the heater.

The aquarium heater according to the present invention is designated generally by the reference numeral 10 and comprises a vertically disposed elongated tube 12 having a closed bottom and an open top 14. A plug 16 is inserted in and closes the open top 14 of the tube 12. Integrally formed with the plug 16, which is fabricated of a resilient material such as rubber or the like, is a skirt 18 depending from the upper edge of the plug 16 and completely enveloping the portion of the tube 12 adjacent the upper end, as shown most clearly in Figure 2.

The tube 12 is substantially filled with an ionizable liquid, such as pure water with a few grains of salt added thereto.

A pair of electrodes 20 and 22 are positioned in spaced relation within the tube 12, the one electrode 20 being totally submerged in the liquid, and the other electrode 22 depending from the plug 16 and being partially submerged in the liquid, the liquid being designated by the reference numeral 24, in Figure 2. The electrode 20 is positioned adjacent the bottom of the receptacle 12 and the electrode 22 is partially below and adjacent the upper level of the liquid 24.

Means is provided connecting the electrodes 20 and 22 to a source of electrical energy. Specifically, this means consists in two wires of a unitary two-wire strand 26 of conventional construction, one wire 28 being connected to the electrode 22 and the other wire 30 being connected to the electrode 20. The free end of the strand 26 carries a conventional electrical plug 32 for insertion into an appropriate electrical outlet in a residential or other building electrical system.

Experimentation will determine the exact number of grains of salt needed to ionize the liquid to the extent that the current will flow between the electrodes 20 and 22 and effect the heating of the liquid 24 to the desired temperature necessary to maintain the water in the aquarium the correct temperature required.

The heater of the present invention may be constructed at reasonable cost and will operate without attention for relatively long periods of time.

What is claimed is:

1. An aquarium heater comprising a vertically disposed elongated tube having a closed bottom and an open top, a plug inserted in and closing the open top of said tube, a skirt depending from the upper edge of said plug and completely enveloping the portion of said tube adjacent the upper end, an ionizable liquid substantially filling said tube, a pair of electrodes positioned in spaced relation within said tube and submerged by said liquid and supported by said plug, and means connecting said electrode to a source of electrical energy.

2. An aquarium heater comprising a vertically disposed elongated tube having a closed bottom and an open top, a plug inserted in and closing the open top of said tube, a skirt depending from the upper edge of said plug and completely enveloping the portion of said tube adjacent the upper end, an ionizable liquid substantially filling said tube, a first electrode positioned within said tube adjacent the bottom thereof, a second electrode positioned within said tube below and adjacent the upper level of said liquid body, said first and second electrodes being supported by said plug, and means connecting said electrodes to a source of electrical energy.

References Cited in the file of this patent

UNITED STATES PATENTS 1,596,869    Claret _____ Aug. 24, 1926

OTHER REFERENCES

Cheng-Hou Lou et al.: Journal Sci. Inst., May 1944, page 88.